United States Patent
Weksler et al.

(10) Patent No.: US 11,861,588 B2
(45) Date of Patent: Jan. 2, 2024

(54) WIRELESS COMMUNICATION ORDER SESSION GENERATION

(71) Applicant: Lenovo (United States) Inc., Morrisville, NC (US)

(72) Inventors: Arnold S. Weksler, Raleigh, NC (US); Nathan J. Peterson, Oxford, NC (US); John Carl Mese, Cary, NC (US); Russell Speight Vanblon, Raleigh, NC (US); Mark Patrick Delaney, Raleigh, NC (US)

(73) Assignee: Lenovo (United States) Inc., Morrisville, NC (US)

(*) Notice: Subject to any disclaimer, the term of this patent is extended or adjusted under 35 U.S.C. 154(b) by 24 days.

(21) Appl. No.: 17/505,556

(22) Filed: Oct. 19, 2021

(65) Prior Publication Data

US 2023/0119247 A1  Apr. 20, 2023

(51) Int. Cl.
| | |
|---|---|
| *G06Q 20/32* | (2012.01) |
| *H04W 4/02* | (2018.01) |
| *H04W 76/14* | (2018.01) |
| *H04W 4/44* | (2018.01) |
| *H04W 4/80* | (2018.01) |

(52) U.S. Cl.
CPC .......... *G06Q 20/327* (2013.01); *H04W 4/023* (2013.01); *H04W 4/44* (2018.02); *H04W 76/14* (2018.02); *H04W 4/80* (2018.02)

(58) Field of Classification Search
CPC .. G06Q 20/32; G06Q 20/327; G06Q 20/3223; G06Q 30/06; G06Q 30/0621; G06Q 50/12; G06Q 20/3276; H04W 4/44; H04W 76/14; H04W 4/023; H04W 4/80

USPC ......................................................... 455/41.2
See application file for complete search history.

(56) References Cited

U.S. PATENT DOCUMENTS

| | | | |
|---|---|---|---|
| 5,710,554 A * | 1/1998 | Pettler ............. | G08G 1/096783 340/901 |
| 5,753,808 A * | 5/1998 | Johnson ............. | G01M 5/0058 73/146 |
| 11,276,020 B1 * | 3/2022 | Samuel ............. | G06Q 20/405 |
| 2004/0260513 A1 * | 12/2004 | Fitzpatrick ........ | G06Q 50/12 702/182 |
| 2013/0024299 A1 * | 1/2013 | Wong ............... | G06Q 50/12 |
| 2014/0347469 A1 * | 11/2014 | Zhang | |
| 2015/0098621 A1 * | 4/2015 | Bernal .............. | G08G 1/095 382/104 |
| 2016/0109858 A1 * | 4/2016 | Oetken ............. | E01C 19/28 404/84.05 |
| 2016/0155328 A1 * | 6/2016 | Bernal .............. | G08G 1/0175 382/104 |
| 2017/0024834 A1 * | 1/2017 | Peterson ........... | G06Q 20/203 |
| 2017/0323370 A1 * | 11/2017 | Burry ............... | G06V 20/54 |
| 2018/0095456 A1 * | 4/2018 | Obaidi .............. | G07C 9/00174 |
| 2018/0122022 A1 * | 5/2018 | Kelly ............... | G06Q 30/0633 |

(Continued)

*Primary Examiner* — Ankur Jain
(74) *Attorney, Agent, or Firm* — Schwegman Lundberg & Woessner, P.A.

(57) ABSTRACT

A computer implemented method includes establishing a wireless communication order session between a communication device associated with a vehicle and an establishment communication system in response to the vehicle being within an ordering area, receiving transaction information indicative of a transaction transmitted from the communication device associated with the vehicle, and associating the transaction with the vehicle.

20 Claims, 3 Drawing Sheets

(56) References Cited

U.S. PATENT DOCUMENTS

| | | | |
|---|---|---|---|
| 2019/0205834 A1* | 7/2019 | Bell | G06Q 10/08355 |
| 2021/0241551 A1* | 8/2021 | Loeshelle | G07C 9/00182 |
| 2022/0245615 A1* | 8/2022 | Soni | G06Q 20/12 |

* cited by examiner

WIRELESS COMMUNICATION ORDER SESSION GENERATION

BACKGROUND

When performing an interaction from an automobile with an establishment representative, such as ordering at a drive through restaurant, performing a banking transaction, or picking up prescriptions, a person must use a generally low audio quality audio system provided by the establishment for communication. The driver usually rolls an automobile window down exposing the driver to potentially bad ambient noise or harsh weather conditions such as rain, sleet, heat, or freezing conditions. Additionally, the driver may need to lower a volume of a speaker system in the automobile.

In a typical drive through experience, as the automobile approaches the proximity of the establishment's provided speaker system, an establishment attendee requests to process an order. The driver then yells into the audio system in an effort to place the order without any level of confidence of it being correct. The driver may not know if the attendee is aware of new driver and usually must repeat both the order and validate that the order was taken correctly. Some establishments such as restaurants provide displays that can be seen by the driver, allowing the driver to catch and hopefully correct errors occurring during the ordering error process.

SUMMARY

A computer implemented method includes establishing a wireless communication order session between a communication device associated with a vehicle and an establishment communication system in response to the vehicle being within an ordering area, receiving transaction information indicative of a transaction transmitted from the communication device associated with the vehicle, and associating the transaction with the vehicle.

DETAILED DESCRIPTION

Figure 1:
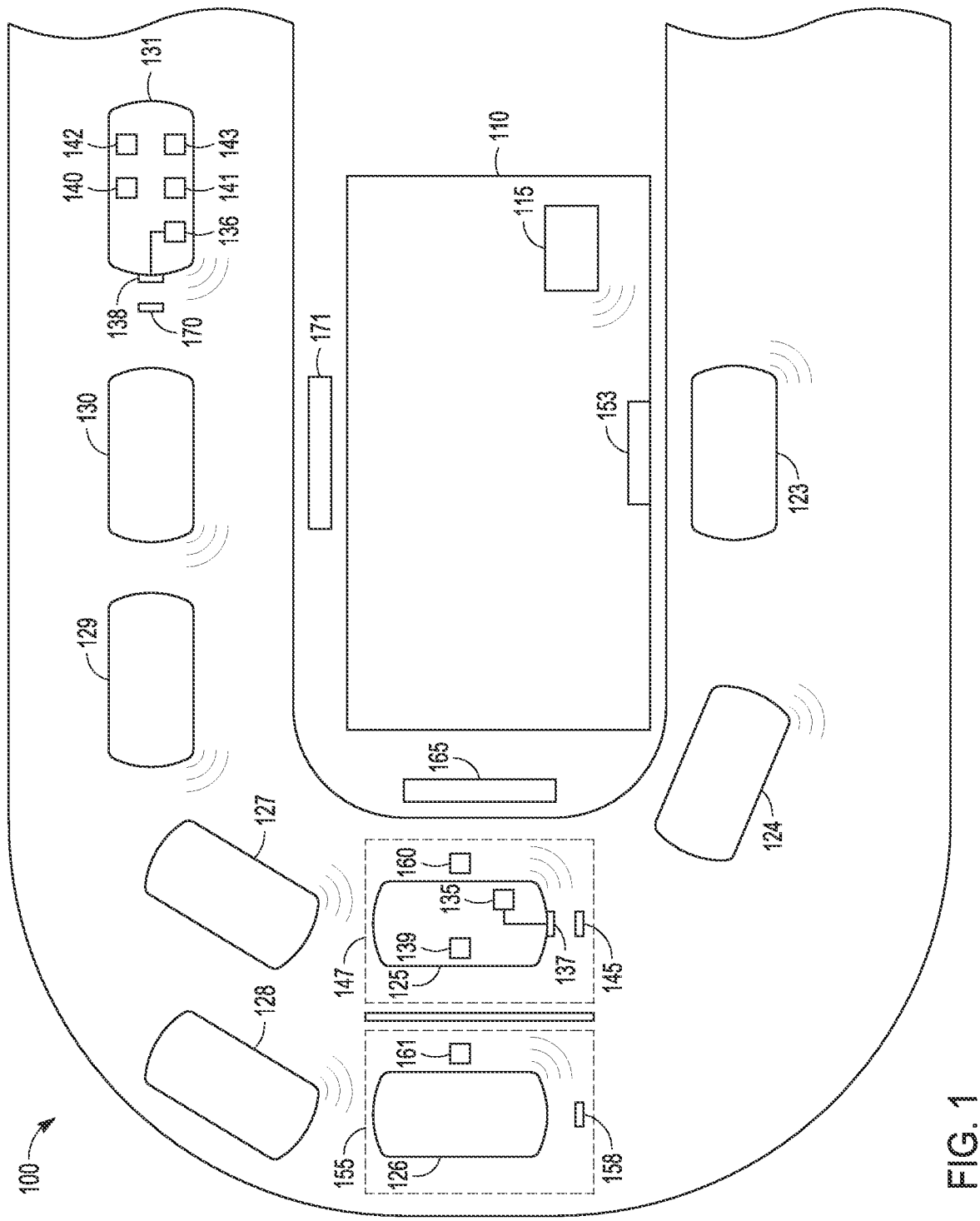
FIG. 1 is a top view of a block representation of an ordering environment 100 according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server, or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

A wireless communication session is established between an establishment communication system and a device associated with a vehicle to facilitate ordering of goods and services. The device associated with the vehicle may provide a better user experience for ordering than prior methods of speaking into a microphone at an ordering station outside the vehicle.

In various embodiments, user equipment in the form a cell phone or vehicle-based communication equipment may be integrated into an ordering experience while the vehicle is near an establishment providing goods or services or both goods and services in a drive through like environment. Communications with such devices may be established by the establishment communication system based on the location of the vehicle as determined by wireless signal strength, detection of the vehicle, or visible codes placed where cameras associated with the vehicle detect such visible codes. Many vehicles, such as electric vehicles, include display screens that can be used as a touchscreen to display a menu and allow ordering of items via the display or via a voice connection.

FIG. 1 is a top view of a block representation of an ordering environment 100 according to an example embodiment. Ordering environment 100 is just one example of a business, a drive through restaurant, in which a wireless communication session may be established to facilitate ordering.

Ordering environment 100 includes an establishment 110 having a wireless communication system 115. A drive through lane 120 is shown with multiple vehicles 123, 124, 125, 126, 127, 128, 129, 130, and 131.

Each vehicle may have one or more wireless communication devices associated with the vehicle. Such devices include a vehicle-based communication system such as shown at 135 in vehicle 125 and at 136 in vehicle 131. Vehicle 125 may also have one or more cameras 136. A downward facing camera 137 is illustrated and coupled to vehicle-based communication system 135. Vehicle 131 is shown with a downward facing camera 138 that is coupled to vehicle-based communication system 136. The wireless communication devices associated with a vehicle may also include one or more user mobile devices as indicated at 139 in vehicle 125 and at 140, 141, 142, and 143 in vehicle 131. Other vehicles shown may also have one or more vehicle associated wireless communication devices.

Wireless communication system 115 may implement one or more communication protocols, including, but not limited to WiFi, Bluetooth, Ultra wide band or other limited range communication protocol that allows the establishment of a wireless connection. In one example, the wireless connection may be performed via pairing by prompting a user of the device to pair with the wireless communication system 115. Such pairing may be used to create an electronic ordering session which allows the communication of data, such as ordering information, between the device and communication system 115.

In one embodiment, the pairing and corresponding ordering session may be initiated in one or more of several ways. In one example, a code 145, such as a QR code may be encoded with connection information. In FIG. 1, code 145 is printed or otherwise displayed on pavement in an ordering area 147 indicted by a broken line. Code 145 contains connection information for use by the device 135 to establish the ordering session.

As vehicle 125 approaches the code 145, the downward facing camera 137 captures the image of the code 145 and provides the ordering session establishing information to the device 135 which may display an option to a user to accept the ordering session or may automatically make the connection. In various examples, the code may include a website link, a conference call link, a video conference link, or other type of code suitable for establishing communications.

The ordering session may include voice communications such as via Voice over IP (VoIP) or may even include a mobile phone call by presenting a phone number to dial by the device 135 to provide a voice connection to a person in establishment 110. The ordering session may alternatively, or in addition, include an interactive menu allowing a person in the vehicle to select items and complete an order, including optionally paying for the order by providing payment information such as a credit card or other payment application information. Communication system 115 may be coupled with or include an ordering system to display and allow interaction with an order in the establishment 110.

The ordering session may also associate a vehicle with an order or transaction. This may be done via an order code provided through the ordering session and to be presented at a pickup location 153 for verification with establishment personnel in delivering the order. Vehicle 123 is shown currently located at the pickup location 153 in FIG. 1. In further examples, the vehicle may be tracked via a communication protocol implemented by communication system 115, which may first identify the vehicle device during ordering in ordering area 147 and continue to track the vehicle as it reaches pickup window 153, providing establishment personnel an indication of the order corresponding to vehicle 123 at the pickup location 153. Ultra wide band communication protocols may be employed to perform vehicle tracking in one example.

In one example, multiple ordering lanes may be provided. Vehicle 126 is shown in a second ordering lane having a second ordering area 155 that includes code 158. Code 158 may be associated with the second lane and is therefore different from code 125. In some examples, a code may be located where it can be scanned by a user device. A code 160 may be located adjacent the ordering zone 147 for scanning by device 139 to establish an ordering session. Similarly, a code 161 may be used for a device associated with vehicle 126 in ordering area 155. Ultra wide band protocols may alternatively or in addition to an order code may be used to track vehicle 126 and provide the correct order to a driver of vehicle 126 at the pickup window 153.

One or more physical menus 165 may also be provided for convenience proximate the ordering areas 147 and 155. An order session establishing code may be located on the physical menu 165 for scanning by a vehicle side camera or user equipment in the vehicle.

Menus may also be provided to devices within vehicles prior to the vehicles reaching an order area. In one example, a code 170 on the pavement for capture by camera 138 on vehicle 131 or on a physical display 171 may be used to communicate a link or other connection information to such menus for one or more devices associated with vehicle 131. Such codes may lead to a connection prior to an order session being established, or simply provide a link for use by the device via a separate connection to view a menu hosted by a website. The provision of such a menu to one or more devices prior to vehicles approaching an order area can facilitate ordering once the order session is established. In one example, physical display 171 may also include a human readable menu.

Wireless signals such as Bluetooth or WiFI allow pairing once it is the vehicle's turn to order. A webpage, with, or without a menu, can be presented with a count-down on when pairing or authentication to establish the ordering session is allowed. Used in this fashion, a vehicle currently with an ordering session in front of a next vehicle would place their order. Once placed, the order session, such as a paired connection, may be terminated. Once that connection is terminated, the next vehicle is provided either instructions on how to connect or a Wifi authorization or Bluetooth pairing option may be presented to facilitate a communication connection and order session. A unique pairing number prevents other vehicles from interfering with an order being placed via the order session. In further examples, the wireless communication order session may be established by the establishment communication system sending a communication to the communication device associated with the vehicle in response to detecting the vehicle or the communication device associated with the vehicle. The vehicle may be detected by a camera associated with the establishment communication system taking images of the vehicle and the system recognizing the vehicle via a code, such as a barcode, on the vehicle that provides contact information for sending a text or electronic message, or or address. A Bluetooth, Wi-Fi, or cell signal from either the vehicle or the cell phone may also be detected via the establishment communication system, with the system responding with a text message or other notification with communication/connection instructions. For repeat customers, device IDs may be detected via such signals and associated with contact information for such communications and for performing automated wireless connections.

Figure 2:
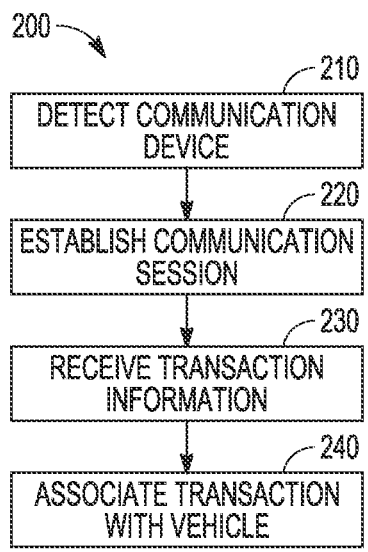
FIG. 2 is a flowchart illustrating a computer implemented method of establishing ordering connection for vehicles at desired times according to an example embodiment.

FIG. 2 is a flowchart illustrating a computer implemented method 200 of establishing a communication connection and ordering session for vehicles at desired times. Method 200 begins by detecting a wireless communication device associated with a vehicle at operation 210. The detection may be done via an establishment wireless communication system. At operation 220, a wireless communication connection and order session is established between the communication device associated with the vehicle and the establishment communication system in response to the vehicle being within an ordering area. Note that the communication connection may already be established in one example, and the ordering session is established in response to the vehicle being within the ordering area. The wireless communication order session may comprise a paired connection. The wireless communication order session may also, or alternatively include voice communications, such as via a VoIP or cellular connection.

Transaction information indicative of a transaction is received at operation 230. The transaction information may be transmitted from the communication device associated with the vehicle via the ordering session. At operation 240, the transaction is associated with the vehicle. The transaction information may also be displayed or otherwise communicated via communication system 115 to personnel of the establishment 110 for order fulfillment.

Figure 3:
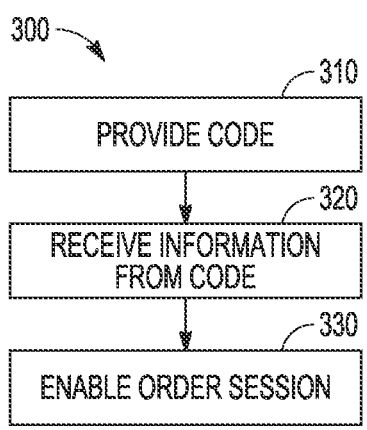
FIG. 3 is a flowchart illustrating a computer implemented method of detecting a wireless communication device associated with a vehicle according to an example embodiment.

FIG. 3 is a flowchart illustrating a computer implemented method 300 of detecting a wireless communication device associated with a vehicle. Method 300 begins by providing a code at operation 310. The code may be displayed as a physical code such as a QR code or may be transmitted via communication system 115 for reception by the communication device associated with the vehicle. At operation 320, the communication system 115 may receive order session information derived from the code and enable the order session at operation 330. The connection code may be derived from an image of the code via the communication device associated with the vehicle to enable the wireless order session.

In one example, the code is displayed on pavement within the ordering area. The communication device associated with the vehicle includes a downward facing camera to capture the image of the code displayed on the pavement and provide the image to the device associated with the vehicle.

In another example, the code is displayed within the ordering area and wherein the communication device associated with the vehicle includes a camera to capture the image of the code, such as a vehicle side facing camera. The communication device associated with the vehicle may be a user mobile device with camera and software suitable for decoding an image of the code.

In a further example, order options, such as a menu, may be provided to the communication device associated with the vehicle prior to the vehicle being within the ordering area.

In one example, establishing the wireless communication session comprises detecting that the vehicle is within the ordering area via proximity sensing. The detection may be done via a sensor in pavement of the ordering area or via an ultra wide band (UWB) communication protocol implemented by the establishment communication system. Such UWB implemented protocols provide direction and distance information sufficient to provide information on the position of the vehicle both during ordering, as well as tracking the vehicle as it progresses to an order pickup window. Associating the transaction with the vehicle may include utilizing proximity sensing to track the vehicle via UWB or even multiple pavement embedded proximity sensors that track movement of the vehicles between such sensors.

Figure 4:
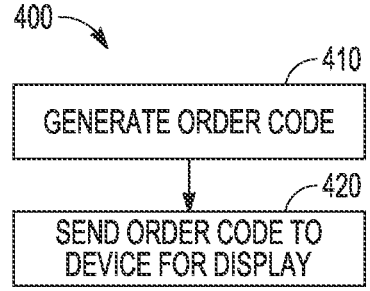
FIG. 4 is a flowchart illustrating a computer implemented method of associating the transaction with the vehicle according to an example embodiment.

FIG. 4 is a flowchart illustrating a computer implemented method 400 of associating the transaction with the vehicle. At operation 410, an order code is generated. The order code is used to identify which order corresponds to which vehicle. At operation 420, the order code is sent to the communication device associated with the vehicle for display or oral communication at a pickup window.

Once pairing or authentication has occurred, either the car display or the cell phone display can also be used to display options to the driver to accommodate speaking to the attendee. Menu items and specials of the day can be presented at restaurants, current balances or last few transactions can be presented for banking, or use of a automatic payment can also be used.

Various establishments and transaction that may be conducted in the above described manners include one or more of an ATM (automated teller machine) or bank for making cash withdrawals or other banking related transactions. Drive through restaurants, as shown in FIG. 1, oil change providers, state or national parks or other venues controlled by gate ticketing, or even toll booths may also benefit.

Figure 5:
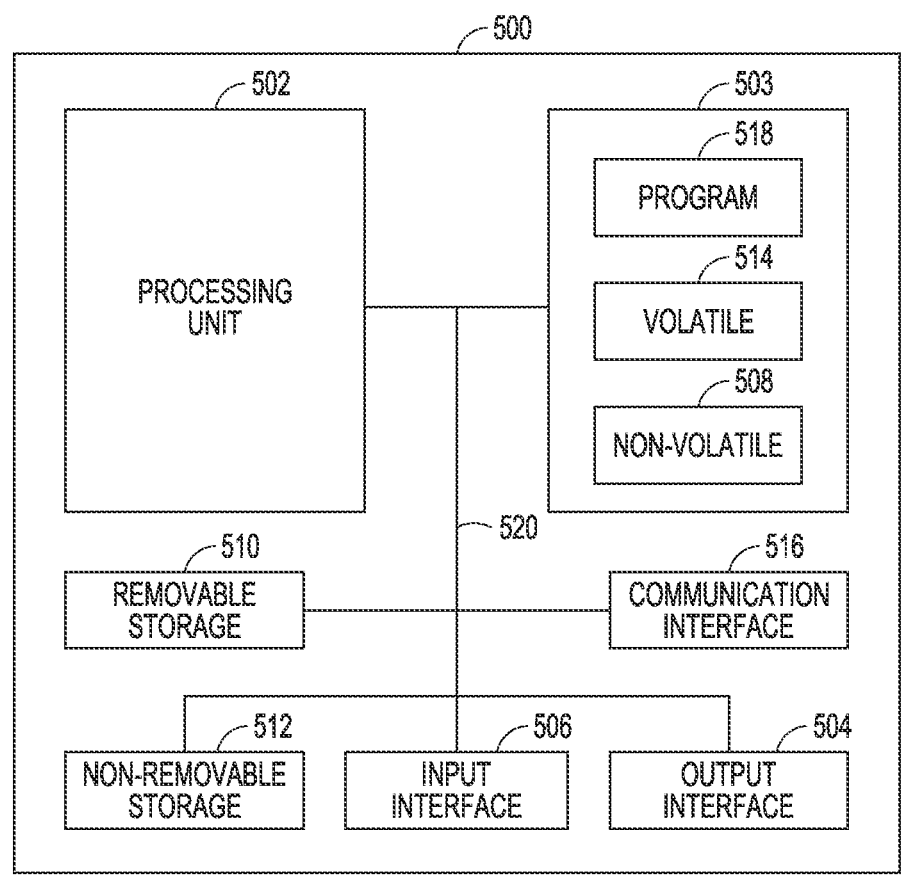
FIG. 5 is a block schematic diagram of a computer system to implement one or more example embodiments.

FIG. 5 is a block schematic diagram of a computer system 500 to implement one or more of the communication devices and systems and for performing methods and algorithms according to example embodiments. All components need not be used in various embodiments.

One example computing device in the form of a computer 500 may include a processing unit 502, memory 503, removable storage 510, and non-removable storage 512. Although the example computing device is illustrated and described as computer 500, the computing device may be in different forms in different embodiments. For example, the computing device may instead be a smartphone, a tablet, smartwatch, smart storage device (SSD), or other computing device including the same or similar elements as illustrated and described with regard to FIG. 5. Devices, such as smartphones, tablets, and smartwatches, are generally collectively referred to as mobile devices or user equipment.

Although the various data storage elements are illustrated as part of the computer 500, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 503 may include volatile memory 514 and non-volatile memory 508. Computer 500 may include—or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 500 may include or have access to a computing environment that includes input interface 506, output interface 504, and a communication interface 516. Output interface 504 may include a display device, such as a touchscreen, that also may serve as an input device. The input interface 506 may include one or more of a touchscreen, touchpad, mouse, keyboard, camera, one or more device-specific buttons, one or more sensors integrated within or coupled via wired or wireless data connections to the computer 500, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 500 are connected with a system bus 520.

Computer-readable instructions stored on a computer-readable medium are executable by the processing unit 502 of the computer 500, such as a program 518. The program 518 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 518 along with the workspace manager 522 may be used to cause processing unit 502 to perform one or more methods or algorithms described herein.

Examples

1. A computer implemented method includes establishing a wireless communication order session between a communication device associated with a vehicle and an establishment communication system in response to the vehicle being within an ordering area, receiving transaction information indicative of a transaction transmitted from the communication device associated with the vehicle, and associating the transaction with the vehicle.

2. The method of example 1 wherein establishing a wireless communication order session includes providing a code to the communication device associated with a vehicle and receiving information from the code via the communication device associated with the vehicle to enable the wireless order session.

3. The method of example 2 and further including detecting the vehicle of the communication device associated with the vehicle, wherein the code is provided via a communication from the establishment communication system to the communication device associated with the vehicle in response to such detecting.

4. The method of any of examples 1-3 wherein establishing a wireless communication order session comprises displaying an image of a code having connection information wherein the code is displayed on pavement within the ordering area.

5. The method of example 4 wherein the communication device associated with the vehicle includes a downward facing camera to capture the image of the code.

6. The method of any of examples 1-5 wherein the communication device associated with the vehicle is a user mobile device.

7. The method of any of examples 1-6 and further including providing order options to the communication device associated with the vehicle prior to the vehicle being within the ordering area.

8. The method of any of examples 1-7 wherein establishing the wireless communication order session comprises detecting that the vehicle is within the ordering area via proximity sensing.

9. The method of example 8 wherein proximity sensing is provided via a sensor in pavement of the ordering area.

10. The method of any of examples 8-9 wherein proximity sensing is provided via an ultra wide band (UWB) communication protocol implemented by the establishment communication system.

11. The method of example 10 wherein associating the transaction with the vehicle comprises utilizing the proximity sensing to track the vehicle.

12. The method of any of examples 1-11 wherein associating the transaction with the vehicle includes generating an order code and sending the order code to the communication device associated with the vehicle.

13. The method of any of examples 1-12 wherein the wireless communication order session comprises a paired connection.

14. The method of any of examples 1-13 wherein the wireless session includes a voice connection and wherein receiving transaction information comprises receiving voice communications.

15. A machine-readable storage device having instructions for execution by a processor of a machine to cause the processor to perform operations to perform any of the methods of examples 1-14.

16. A device includes a processor and a memory device coupled to the processor and having a program stored thereon for execution by the processor to perform operations to perform any of the methods of examples 1-14.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
    establishing a wireless communication order session between a communication device associated with a vehicle and an establishment communication system wireless network in response to the vehicle being within an ordering area that is within a range of the wireless network by pairing the communication device with the wireless network in response to receiving a code from the communication device;
    receiving, via the wireless network, transaction information indicative of a transaction to place an order transmitted from the communication device associated with the vehicle; and
    associating the transaction with the vehicle.

2. The method of claim 1 wherein establishing the wireless communication order session comprises:
    providing the code to the communication device associated with the vehicle in a manner detectable by a cameral of the communication device.

3. The method of claim 2 and further comprising detecting the communication device associated with the vehicle, wherein the code is provided via a communication from the establishment communication system to the communication device associated with the vehicle in response to such detecting.

4. The method of claim 1 wherein the code is displayed on pavement within the ordering area.

5. The method of claim 4 wherein the communication device associated with the vehicle includes a downward facing camera to capture the image of the code.

6. The method of claim 1 wherein the communication device associated with the vehicle is a user mobile device.

7. The method of claim 1 and further comprising providing order options prior to the vehicle being within the ordering area.

8. The method of claim 1 wherein establishing the wireless communication order session comprises detecting that the vehicle is within the ordering area via proximity sensing.

9. The method of claim 8 wherein proximity sensing is provided via a sensor in pavement of the ordering area.

10. The method of claim 8 wherein proximity sensing is provided via an ultra wide band (UWB) communication protocol implemented by the establishment communication system.

11. The method of claim 10 wherein associating the transaction with the vehicle comprises utilizing the proximity sensing to track the vehicle.

12. The method of claim 1 wherein associating the transaction with the vehicle comprises:
    generating an order code; and
    sending the order code to the communication device associated with the vehicle.

13. The method of claim 1 wherein the wireless network comprises a local area network.

14. The method of claim 1 wherein the wireless session includes a voice over IP voice connection over the wireless network and wherein receiving transaction information comprises receiving voice communications.

15. A machine-readable storage device having instructions for execution by a processor of a machine to cause the processor to perform operations to perform a method, the operations comprising:
    establishing a wireless communication order session between a communication device associated with a vehicle and an establishment communication system wireless network in response to the vehicle being within an ordering area that is within a range of the wireless network by pairing the communication device with the wireless network in response to receiving a code from the communication device;
    receiving, via the wireless network, transaction information indicative of a transaction to place an order transmitted from the communication device associated with the vehicle; and
    associating the transaction with the vehicle.

16. The method of claim 15 wherein establishing the wireless communication order session comprises:
    providing the code to the communication device associated with the vehicle in a manner detectable by a cameral of the communication device.

17. The method of claim 16 wherein the operations further comprise detecting the communication device associated with the vehicle, wherein the code is provided via a communication from the establishment communication system to the communication device associated with the vehicle in response to such detecting.

18. The method of claim 17 wherein the communication device associated with the vehicle includes a downward facing camera to capture the image of the code.

19. The method of claim 15 wherein the code is displayed on pavement within the ordering area.

20. A device comprising:
    a processor; and
    a memory device coupled to the processor and having a program stored thereon for execution by the processor to perform operations comprising:
        establishing a wireless communication order session between a communication device associated with a vehicle and an establishment communication system wireless network in response to the vehicle being within an ordering area that is within a range of the wireless network by pairing the communication device with the wireless network in response to receiving a code from the communication device;
        receiving, via the wireless network, transaction information indicative of a transaction to place an order transmitted from the communication device associated with the vehicle; and
        associating the transaction with the vehicle.

* * * * *